(12) United States Patent
Hoehn et al.

(10) Patent No.: US 9,593,566 B2
(45) Date of Patent: Mar. 14, 2017

(54) SEMI-AUTONOMOUS DRILLING CONTROL

(71) Applicants: Oliver Hoehn, Celle (DE); Joern Koeneke, Hannover (DE)

(72) Inventors: Oliver Hoehn, Celle (DE); Joern Koeneke, Hannover (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 547 days.

(21) Appl. No.: 14/061,024

(22) Filed: Oct. 23, 2013

(65) Prior Publication Data

US 2015/0112488 A1 Apr. 23, 2015

(51) Int. Cl.
G05B 13/02 (2006.01)
E21B 44/00 (2006.01)
G05B 13/04 (2006.01)

(52) U.S. Cl.
CPC .......... E21B 44/00 (2013.01); *G05B 13/041* (2013.01); *G05B 13/042* (2013.01)

(58) Field of Classification Search
CPC ........ E21B 44/00; E21B 47/024; E21B 7/062; G05B 11/42; G05B 13/024; G05B 13/041; G05B 13/042; G05B 13/021; G05B 13/048; G05B 2219/32015
See application file for complete search history.

(56) References Cited

U.S. PATENT DOCUMENTS

| 4,168,608 A | 9/1979 | Uram |
| 5,818,714 A * | 10/1998 | Zou ...................... G05B 13/042 700/37 |
| 6,654,732 B1 | 11/2003 | Naito et al. |
| 7,142,986 B2 * | 11/2006 | Moran .................... E21B 44/00 702/9 |

(Continued)

FOREIGN PATENT DOCUMENTS

| GB | 2395315 A | 5/2004 |
| GB | 2454701 A | 5/2009 |
| GB | 2460556 A | 12/2009 |

OTHER PUBLICATIONS

Florence, "DrillLink/CyberLink saves offshore operators time and money with automated control", Drilling & Completion, Offshore, Dec. 2008, pp. 68-70, www.offshore-mag.com.

(Continued)

*Primary Examiner* — Darrin Dunn
(74) *Attorney, Agent, or Firm* — Cantor Colburn LLP

(57) ABSTRACT

A method of facilitating a drilling operation includes: receiving a current set point for a drilling operation, the current set point indicating a value of an operational parameter at which the drilling operation is being performed; receiving a global limit indicating at least one of a maximum and a minimum value of the operational parameter that is permitted to be applied for the drilling operation; defining a local limit for the operational parameter, the local limit indicating at least one of a local maximum value and a local minimum value of the operational parameter; receiving a parameter change (Continued)

value, the parameter change value indicating a proposed change to the operational parameter from the current set point; and selecting a level of automation by which the operational parameter can be adjusted, the level of automation based on a comparison of the parameter change value and the local limit.

18 Claims, 6 Drawing Sheets

(56) References Cited

U.S. PATENT DOCUMENTS

| | | | |
|---|---|---|---|
| 2004/0049295 A1* | 3/2004 | Wojsznis | G05B 11/32 700/28 |
| 2004/0112640 A1 | 6/2004 | Hay et al. | |
| 2004/0251027 A1 | 12/2004 | Sonnier et al. | |
| 2005/0189142 A1 | 9/2005 | Garcia et al. | |
| 2006/0031024 A1* | 2/2006 | Mountassir | G06Q 10/04 702/19 |
| 2007/0168058 A1* | 7/2007 | Kephart | G05B 9/03 700/82 |
| 2007/0198223 A1 | 8/2007 | Ella et al. | |
| 2008/0027704 A1* | 1/2008 | Kephart | G05B 19/41885 703/22 |
| 2010/0179794 A1* | 7/2010 | Shah | G06F 17/50 703/6 |
| 2010/0191516 A1 | 7/2010 | Benish et al. | |
| 2010/0292967 A2* | 11/2010 | Verseput | G06Q 10/04 703/2 |
| 2011/0220410 A1 | 9/2011 | Aldred et al. | |
| 2012/0059521 A1 | 3/2012 | Iversen et al. | |
| 2012/0118637 A1 | 5/2012 | Wang et al. | |
| 2012/0173218 A1 | 7/2012 | Shafer et al. | |
| 2012/0217067 A1 | 8/2012 | Mebane, III et al. | |
| 2013/0146358 A1 | 6/2013 | DiSantis | |
| 2014/0075452 A1* | 3/2014 | Supalov | G06F 9/5066 719/313 |
| 2014/0214325 A1* | 7/2014 | Wessling | E21B 47/06 702/11 |
| 2014/0326449 A1* | 11/2014 | Samuel | E21B 44/00 166/250.01 |
| 2015/0252664 A1* | 9/2015 | Astrid | E21B 44/04 700/275 |

OTHER PUBLICATIONS

Thorogood, "Drilling Automation: Technologies, Terminology and Parallels With Other Industries", SPE/IADC 119884, SPE/IADC Drilling Conference and Exhibition, Amsterdam, The Netherlands, Mar. 17-19, 2009, 9 pages.

Rudat, "Development of an Innovative Model-Based Stick/Slip Control System", SPE/IADC 139996, SPE/IADC Drilling Conference and Exhibition, Amsterdam, The Netherlands, Mar. 1-3, 2011, 12 pages.

Notification of Transmittal of the International Search Report and the Written Opinion of the International Searching Authority; PCT/US2014/061543; Korean Intellectual Property Office; Mailed Jan. 28, 2015; 9 pages.

Aldred, et al., "Drilling Automation", Oilfield Review, Summer/Jul. 2012, vol. 24, No. 2, pp. 18-27.

* cited by examiner

SEMI-AUTONOMOUS DRILLING CONTROL

BACKGROUND

Some production of hydrocarbons such as oil and gas involves drilling a borehole via a drill string, through which hydrocarbons are extracted. Boreholes are usually drilled along predetermined paths by a human drill rig operator, with the aid of a control system that can guide the operator and the drilling of a typical borehole proceeds through various formations. During a typical drilling operation, the operator adjusts various drilling parameters in response to detection of certain downhole conditions. The control system can assist the operator by monitoring downhole conditions, providing measurement data and suggesting drilling parameter adjustments to optimize the drilling operation. For example, some control systems receive data relating to surface and/or downhole condition measurements and output a set of recommended values for the drilling parameters (e.g., bit RPM) based on analysis of such measurements.

Optimization of the drilling process, in some instances, requires changing set points continually in order to find optimal drilling parameters. Typically, the control system calculates and outputs the set points to the operator, who adjusts drilling parameters accordingly. Factors that can affect drilling performance include the workload for the operator, i.e., the number and frequency of manual adjustments required to be performed by the operator. A heavy workload for the operator can lead to reduced efficiency and errors in making adjustments to drilling parameters.

SUMMARY

A method of facilitating a drilling operation includes: receiving a current set point for a drilling operation, the current set point indicating a value of an operational parameter at which the drilling operation is being performed; receiving a global limit indicating at least one of a maximum and a minimum value of the operational parameter that is permitted to be applied for the drilling operation; defining a local limit for the operational parameter, the local limit indicating at least one of a local maximum value and a local minimum value of the operational parameter; receiving a parameter change value, the parameter change value indicating a proposed change to the operational parameter from the current set point; and selecting a level of automation by which the operational parameter can be adjusted, the level of automation based on a comparison of the parameter change value and the local limit.

A system for facilitating a drilling operation includes a carrier configured to be disposed in a borehole in an earth formation, at least one of a surface sensor and a downhole sensor configured to measure parameters associated with the drilling operation, a drilling control processor an automation control processor. The drilling control processor is configured to receive a current set point for a drilling operation, the current set point indicating a value of an operational parameter at which the drilling operation is being performed, the drilling control processor configured to generate a proposed change to the operational parameter from the current set point, the operational parameter subject to a global limit indicating at least one of a maximum and a minimum value of the operational parameter that is permitted to be applied for the drilling operation. The automation control processor is configured to: receive the current set point, the global limit and a parameter change value indicating the proposed change; define a local limit for the operational parameter, the local limit indicating at least one of a local maximum value and a local minimum value of the operational parameter; and select a level of automation by which the operational parameter can be adjusted, the level of automation based on a comparison of the parameter change value and the local limit.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Systems and methods are provided for facilitating drilling operations. The systems and methods are configured to control the level of automation that can be employed during a drilling operation, and can also be configured to control and/or optimize the drilling operation. Embodiments include a control system configured to control drilling parameters and employ a selected automation level based on a proposed change in a parameter set point.

Embodiments facilitate a semi-automated drilling control method that makes drilling parameter adjustments by a control processor and/or a human operator based on selected levels of automation. The embodiments allow for making relative small parameter and/or set point changes autonomously without disturbing a human driller or operator. Such changes may include those selected or proposed by a control or optimization algorithm, or those required for model parameter identification. The embodiments allow for selective automation to reduce errors and operator workload while maintaining operator authority for relatively large changes which are potentially critical for the drilling equipment or the drilling process.

In one embodiment, a processing device and method define an input parameter range or parameter space for one or more parameters. The parameter space defines global limits for each parameter, i.e., overall maximum and/or minimum values for parameters that can be applied for the drilling operation. The method also defines a local limit or subspace that is smaller than the global limit. The local limit defines local maximum and/or minimum values for each parameter. Changes to parameters from a current set point that stay within the local limit or subspace may be applied autonomously (or at a selected level of automation). Changes that go outside of the local limit or subspace are applied at a lower level of automation (e.g., an advisory level that requires authorization from a user, or a manual level).

Figure 1:
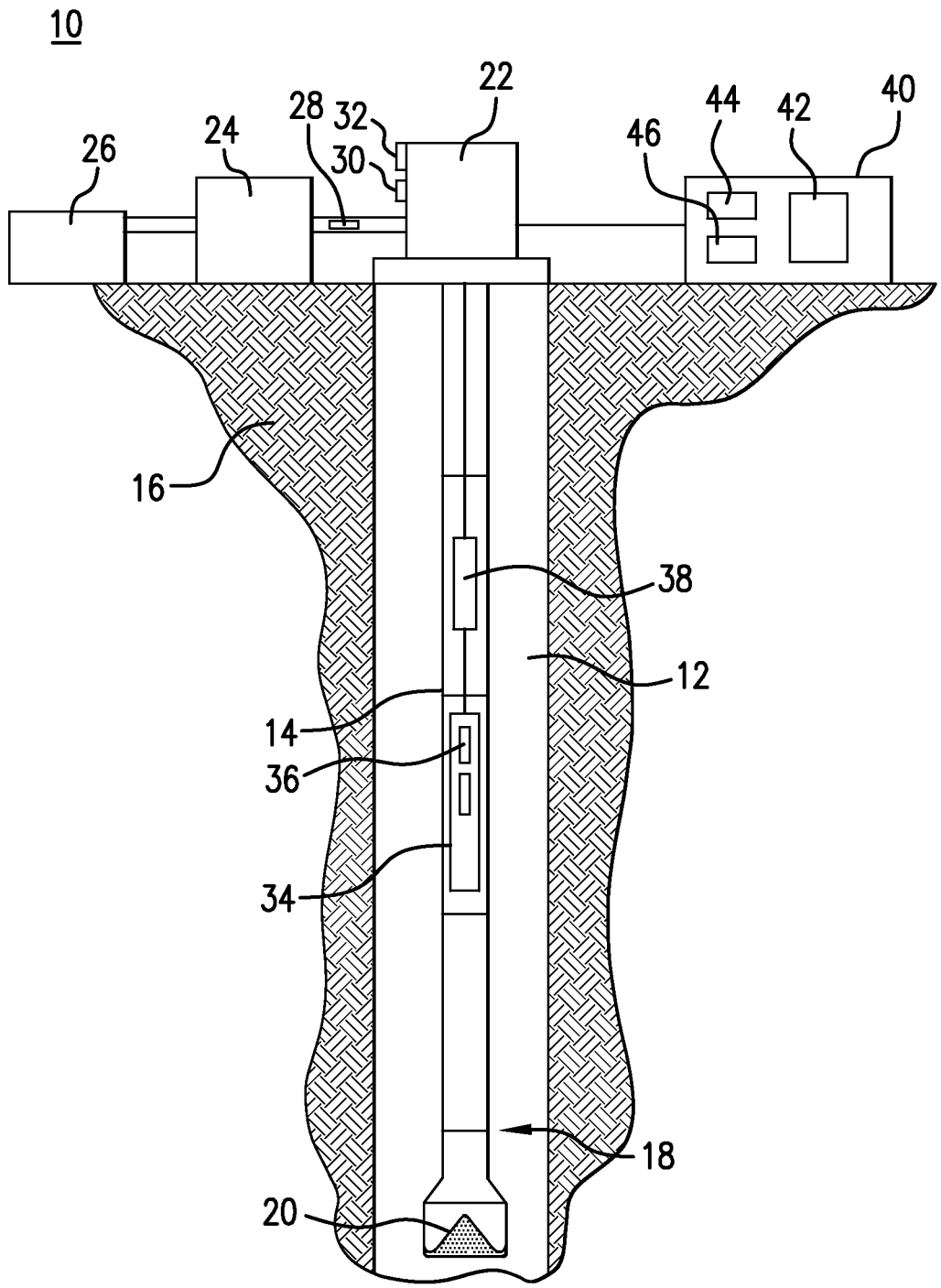
FIG. 1 is a side cross-sectional view of an embodiment of a drilling system.

Referring to FIG. 1, an exemplary embodiment of a downhole drilling system 10 disposed in a borehole 12 is shown. A drill string 14 is disposed in the borehole 12, which penetrates at least one earth formation 16. Although the borehole 12 is shown in FIG. 1 to be of constant diameter, the borehole is not so limited. For example, the borehole 12 may be of varying diameter and/or direction (e.g., azimuth and inclination). The drill string 14 is made from, for example, a pipe or multiple pipe sections. The system 10 and/or the drill string 14 include a drilling assembly 18. Various measurement tools may also be incorporated into the system 10 to affect measurement regimes such as logging-while-drilling (LWD) applications.

The drilling assembly 18, which may be configured as a bottomhole assembly (BHA), includes a drill bit 20 that is attached to the bottom end of the drill string 14 via various drilling assembly components. The drilling assembly 18 is configured to be conveyed into the borehole 12 from a drilling rig 22. During drilling operations, a drilling fluid is pumped through the drill string 14 by a pumping device 24 from a fluid storage 26 (e.g., a mud tank or mud pit) and circulates through the borehole 12. The drilling assembly 18 also includes various components for structural and operational support to the drill bit 20, such as a drilling motor (also referred to as a mud motor), and a stabilizer or reamer.

The system 10 may also include various sensors, tools or other devices for measuring surface and downhole parameters related to a drilling operation. For example, one or more sensors or sensor assemblies can be disposed at surface and/or downhole locations to measure parameters of the borehole, formation, drill string and/or to measure operational parameters. Exemplary surface sensors include a fluid flow and/or pressure sensor 28 for measuring drilling fluid, a surface torque sensor 30 for measuring torque applied to the drill bit 20 and a rotational speed and acceleration sensor 32 for measuring rotation of the drill string 14. Other surface sensors may be included for measuring or calculating operational parameters such as weight on bit (WOB), position and rate of penetration (ROP).

Any number of sensors may be incorporated downhole. For example, a downhole tool 34 is incorporated into any location along the drill string-14 and includes sensors 36 for measuring downhole fluid flow and/or pressure in the drill string-14 and/or in the annular space to measure return fluid flow and/or pressure. Other sensors 36 may be included to measure and/or calculate downhole component parameters, such as downhole vibration, bending moment, acceleration, oscillations, whirl, and stick-slip, as well as operational parameters such as rotation rate, WOB, ROP, axial movement, temperature, stress and strain. Downhole tools and sensors may include a single tool or multiple tools disposed downhole, and sensors may include multiple sensors such as distributed sensors or sensors arrayed along a borehole string.

The sensors and downhole tool configurations are not limited to those described herein. The sensors and/or downhole tool 34 may be configured to provide data regarding measurements, communication with surface or downhole processors, as well as control functions. Such sensors can be deployed before, during or after drilling, e.g., via wireline, measurement-while-drilling ("MWD") or logging-while-drilling ("LWD") components. Exemplary parameters that could be measured or monitored include resistivity, density, porosity, permeability, acoustic properties, nuclear-magnetic resonance properties, formation pressures, properties or characteristics of the fluids downhole and other desired properties of the formation surrounding the borehole-12

Components including the surface and downhole sensors transmit signals to one or more processing devices in the form of, e.g., measurement signals, data, telemetry signals, etc. Exemplary processing devices include a downhole electronics unit 38, which may receive signals and data and communicate with a surface processing device. Other exemplary processing devices include a surface processing unit 40. Signals and data may be transmitted via any suitable transmission device or system, such as wired pipe, electric and/or fiber optic connections, mud pulse, electromagnetic and acoustic telemetry.

In one embodiment, the surface processing unit 40 is connected in operable communication with the drilling assembly 18 and various sensors, and may be located, for example, at a surface location, a subsea location and/or a surface location on a marine well platform or a marine craft. The processing unit 40 is configured to perform functions such as controlling the drilling assembly 18 and components of the drilling system 10, transmitting and receiving data, and monitoring the drilling assembly 18 and the drill string 14. The processing unit 40, in one embodiment, includes a processor 42, a data storage device (or a computer-readable medium) 44 for storing, data, models and/or computer programs or software 46. The downhole tool 34, BHA and/or other components of the system 10 may also include components as necessary to provide for storing and/or processing data collected from various sensors therein. Exemplary components include, without limitation, at least one processor, storage, memory, input devices, output devices and the like.

During a drilling operation, a drilling control processor or processing device (e.g., the processing unit 40) and/or a human drill rig operator, based on various sensor information, can adjust parameters of the drilling operation ("operational parameters" or "drilling parameters"). Such parameters include, without limitation, the WOB applied to a drill bit, hookload, the torque applied to a drill string and drill bit (via surface drive and/or mud motor), the rotational speed (e.g., revolutions per minute or RPM) and acceleration, the axial position, speed, and acceleration, drilling fluid (e.g., mud) properties, and the pressure and flow rate of drilling fluid. Parameters may also include one or more downhole parameters which can be adjusted by, e.g., mud-pulse-telemetry or wired-pipe-telemetry. Examples of such downhole parameters include damping rate, stiffness of passive downhole vibration damper, and the parameterization of an active damping device. In one embodiment, the processing unit 40 executes an algorithm or program that determines one or more target set points at which the operation should be maintained or to which the operation should be adjusted. The algorithm or program may also be configured to excite the drilling system in order to collect information for constructing or updating a drilling model.

A "set point" as described herein refers to a value of one or more drilling parameters. A "current set point" refers to one or more parameters at which the drilling operation is operating. A "target set point" refers to the value of one or more parameters to which a control or optimization algorithm indicates that the drilling operation should be adjusted.

Exemplary algorithms include optimization algorithms that determine a preferred or optimal set point (or range of set points) at which the drilling operation should be performed to satisfy certain drilling operation criteria (e.g., drilling path, tool wear conditions, vibration conditions, ROP, wellbore integrity etc.). The target set point may thus be one or more parameter values determined as preferred or optimal for performing the drilling operation.

In one embodiment, the target set point refers to a change or changes in parameters that are required by the algorithm to calculate model parameters. For example, a processing device may apply relatively small parameter changes around a current set point, in order to excite the system and collect information regarding to the system's reaction to parameter changes, which is used to update a system model. For identification or calculation of model parameters, information can be collected and/or calculations performed at the surface (e.g., in the processing unit 40) and/or downhole (e.g., in the downhole tool 34). An advantage of downhole identification is that some downhole measurements are available with a relatively high sampling rate.

The system 10 also includes a processing device, such as the surface processing unit 40 or a component thereof, that executes an algorithm for determining a level of automation that is employed in controlling the drilling operation, i.e., controlling or adjusting operational parameters. The processing device, which in this embodiment is described as an "automation control processor", is configured to communicate with a drill rig operator. The automation control processor may also perform drilling operation control functions, or communicate with a drilling control device or system. The automation control processing can be part of a processing device that controls the operational parameters and/or communicates with an operator, or can be a separate device or component in communication with the processing device and/or the operator.

Thus, in one embodiment, the methods and systems described herein employ at least two types of algorithms or methods. The algorithms may be separate and used in conjunction or may be part of a single algorithm or program. A first algorithm is a "drilling control" or "drilling optimization" algorithm that calculates set points at which a drilling operation should be performed. Operational parameters can be adjusted by a processor executing the drilling optimization algorithm or in conjunction with another processor, or the operational parameters can be adjusted by an operator based on information output by the drilling control algorithm. A second algorithm is an "automation control" algorithm that determines the level of automation used by the system to control operational parameters. For example, the automation control algorithm can determine that the operational parameters can be adjusted to the set point automatically by a processor, or manually by an operator.

In one embodiment an optimization algorithm performs an automated optimization method that uses a quality function to select set points that are preferred or optimal based on measurements. The quality function considers, e.g., different vibration levels, distances to set point limits, ROP and/or other parameters.

One example of an automated optimization method utilizes online optimization (e.g. a downhill simplex algorithm). This method does not require a model. Several set point combinations are applied and for each combination the quality function is determined while drilling. Based on the results, a target set point is proposed which is closer to the optimum, or "sweet spot". Finding the sweet spot is an iterative process which involves multiple set point changes.

Another example is offline optimization, which determines the sweet spot based on a model of the drilling process. This model can be, e.g., a statistical model or a physical model. Since the drilling process and drilling environment changes over time, the model is continually adapted. Model parameters are calculated and updated by exciting the drilling system. This means that the set points are varied continually. For example, parameters are updated by using parameter estimation algorithms (e.g., Kalman Filter, Least-Squares Method, etc.) or observers. These algorithms require measurements which contain a sufficient amount of information. In order to collect sufficient information, in one embodiment, the drilling system is excited with noise (e.g., PRBS) or test functions. Excitation can be performed by any suitable method or technique, such as impulse- or step-function, noise, PRBS, arbitrary continuous signal, fixed pattern excitation, chirp, sweep, etc.

During the drilling operation, based on downhole and/or surface measurements, target set points are calculated that represent a desired or optimal value for one or more operational parameters. A target set point may be a value for a single parameter, or may be a combination of parameters. The drilling parameters typically controlled during drilling operations include the weight-on-bit (WOB), drilling fluid flow through the drill pipe (flow rate and pressure), the drill string rotational speed, axial position of the drill string and drill bit within the borehole, and the density and viscosity of the drilling fluid.

The automation control processor is configured to select and/or receive set point information. Based on the set point information, the automation control processor determines a change in one or more operational parameters from a current parameter or set point that is required to achieve the target set point.

The automation control processor is configured to select a level of automation for adjusting drilling parameters based on the value of the parameter change. In one embodiment, the automation control processor sets or receives a local parameter limit or range around the current set point. If the set point change relative to the current set point is within the local limit, a processor such as the drilling control processor is allowed to change the parameter(s) to the next set point using a first automation level selected by the automation control algorithm. Thus, the parameter change can be fully automated or performed at a selected level of automation. For example, if the parameter change is within the local limit, the parameter change can be performed by a drilling controller without requiring user or operator input, such as notification, approval or user control.

If the change is outside of the local limit, a second level of automation for changing the parameter(s) is selected, which is lower than the first automation level (e.g., full automation). For example, if the parameter change is outside the local limit, the controller or optimization processor is required to get permission from an operator, notify an operator and/or provide the parameter change and set point information to the operator so that the operator manually changes the parameter(s). Some embodiments described herein discuss two automation levels for a local limit, e.g., a first automation level for a parameter change inside a local limit and a second automation level for a parameter change outside of the local limit. However, the number of automation levels that can be selected is not limited to two, and can be any number of automation levels, i.e., three or more. For example, local limits can be defined to correspond to three or more automation levels, e.g., by defining multiple local limits or subspaces around a set point or within global limits. Each of the multiple local limits or subspaces can be associated with a different automation level. In addition, more than one automation level can be selected for a parameter change that is inside a local limit or outside of a local limit. For example, a parameter change that is outside of a local limit can be associated with multiple automation levels from which an automation level is selected by a processor or operator.

In one embodiment, the local limit is selected to be within a global limit that restricts the drilling parameters to within a selected range. This global limit represents the maximum and/or minimum value for a drilling parameter or parameter. The local limit establishes a range that of values that is within the global limit or is smaller than the global limit.

As discussed above, the automation control processor selects one or more levels of automation that is associated with each local limit. In one embodiment, a driller or operator defines the level or levels of automation associated with each local limit prior to the processor performing the automation control.

Figure 2:
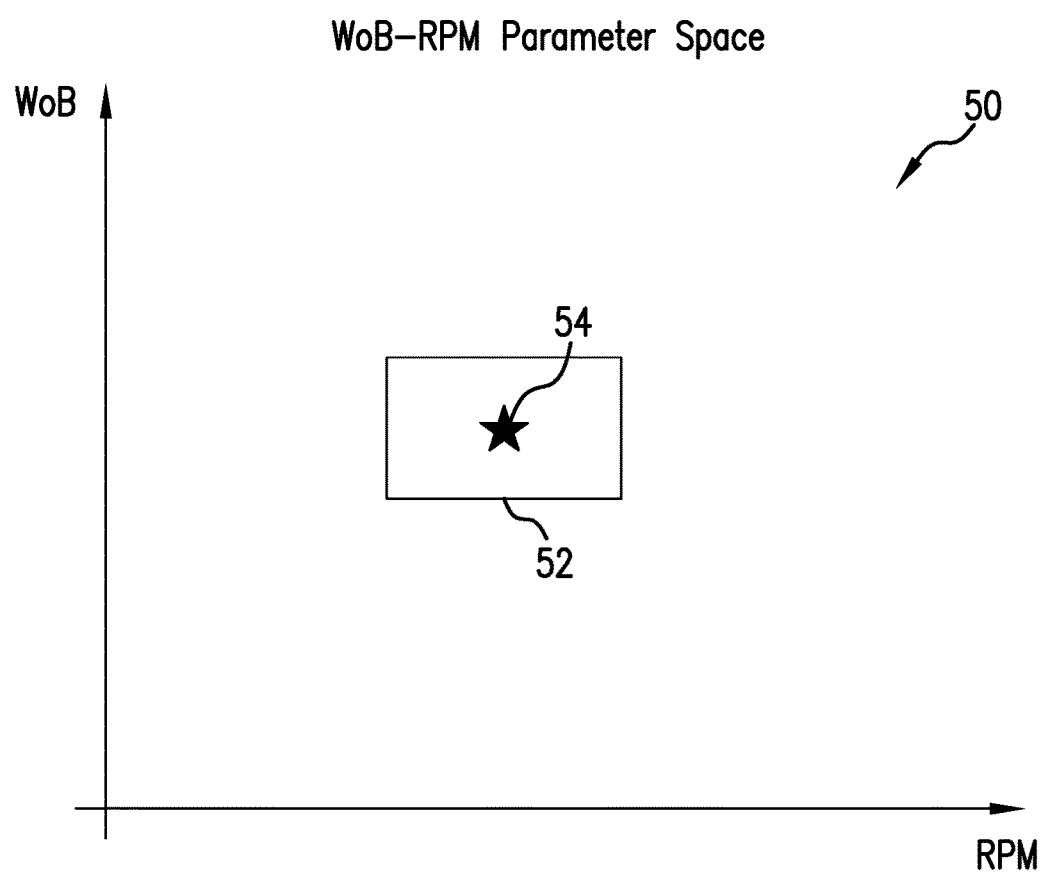
FIG. 2 illustrates a parameter space for a drilling operation.

For example, as shown in FIG. 2, a drilling control processor designates a parameter space 50 representing one or more drilling parameters. In this example, the parameter space 50 is defined by a WOB parameter (the vertical axis) and a revolutions per minute (RPM) parameter (the horizontal axis), but may be defined by any number and/or type of parameter. The parameters shown in FIG. 2 are exemplary; any parameters related to a drilling operation may be used.

The parameter space 50 is limited according to a global limit or limits (e.g., maximum and minimum WOB, and maximum and minimum RPM). The automation control processor designates the local limit as a subspace 52 around a set point that is within the parameter space 50. Any parameter changes that maintain the drilling parameters within the subspace can be autonomously applied or at least applied according to a higher automation level that is applied if the drilling parameters are outside the subspace. As shown, the subspace is rectangular but is not so limited. The subspace can be any suitable shape or size (e.g., round, oval, non-symmetrical, etc.). The subspace can be positioned relative to a current set point, a target set point or other parameter or parameter combination. In addition, the subspace or local limit size or range can be absolute, or based on a set point or parameter value. For example, the local limit can be defined as a percentage (e.g., 2-5%) of a parameter value.

In addition to (or instead of) defining the subspace for a combination of parameters, one or more subspaces can be defined for each of the parameters. A local limit (e.g., a range of values or a specific parameter value) or multiple local limits can be defined for each parameter. Each local limit is associated with a respective level or levels of automation. For example, an automation level can be assigned to each of one or more levels or ranges of the WOB parameter, and another automation level can be assigned to each of one or more levels or ranges of the RPM parameter. As is evident, the subspace may define multiple limits or subspaces for different parameter types and parameter values.

For example, the subspace is defined around a set point 54, such as a target set point selected by the optimization algorithm. If the current set point at which the drilling system is currently being operated is within the subspace 52, the parameters can be changed to align with the target set point at a high automation level, e.g., the drilling control processor can change parameters autonomously. If the current set point is outside the subspace 52, a lower level of automation is employed in changing the parameters.

The subspace can also be defined around a current set point. For example, if the set point 54 is a current set point, the level of automation is determined based on whether the parameter change desired by the system and/or optimization algorithm moves the parameters to a parameter space location within the subspace 52 or outside the subspace 52.

Various levels of automation can be employed in performing the drilling operation and adjusting operation parameters in line with an optimization or control algorithm. "Full automation" refers to a state in which control of drilling parameters is fully automated and a drilling controller autonomously changes drilling parameters. A lower level of automation requires some form of operator input. For example, a drilling control processor can act as an advisory system that proposes optimal set points and lets the operator change the parameters.

Exemplary levels of automation are described below and labeled as 1-10, with "1" being the lowest level of automation (full manual control) and "10" being the highest level of automation (fully automated). The levels can also be grouped into three tiers:

Exemplary Automation Levels

Figure 3:
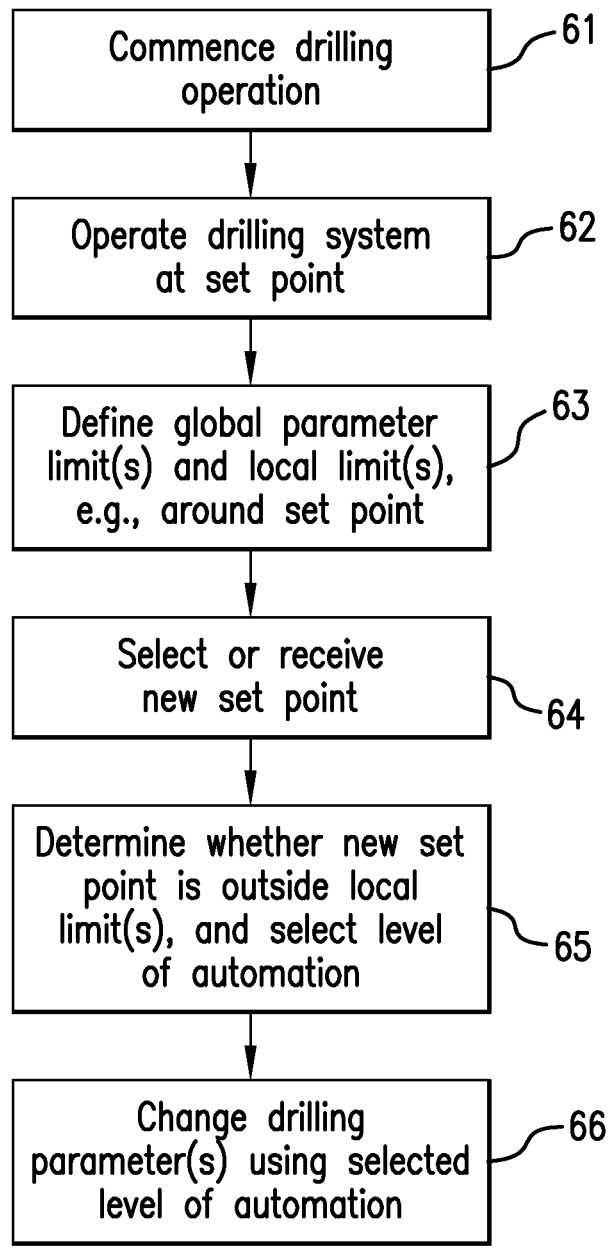
FIG. 3 is a flow chart illustrating a method of performing a drilling operation, calculating operational parameters and/or determining levels of automation in controlling a drilling operation.

Level 10 - Controller decides everything and acts autonomously
Level 9 - Controller executes an action automatically and informs user only if asked
Level 8 - Controller executes an action automatically and informs user only if controller takes action
Level 7 - Controller executes an action automatically, then necessarily informs user
Level 6 - Controller allows user a restricted time to veto an action before automatic execution
Level 5 - Controller selects and executes a suggestion if user approves
Level 4 - Controller suggests a single course of action; user performs actions
Level 3 - Controller suggests a set of alternative actions and can narrow selection of actions; user performs actions
Level 2 - Controller offers a complete set of decision and action alternatives; user performs actions
Level 1 - Controller offers no assistance; user makes all decisions and performs actions FIG. 3 illustrates a method 60 of performing a drilling operation, calculating operational parameters and determining levels of automation in controlling a drilling operation. The method 60 is used in conjunction with the system 10 and/or the surface processing unit 40, although the method 60 may be utilized in conjunction with any suitable combination of sensing devices and processors. The method 60 includes one or more stages 61-66. In one embodiment, the method 60 includes the execution of all of stages 61-66 in the order described. However, certain stages may be omitted, stages may be added, or the order of the stages changed.

In the first stage 61, a drilling operation is commenced using, e.g., the system 10 and the drill string 14. During the operation, surface and/or downhole parameters such as fluid pressure, temperature and drilling parameters are estimated via sensor devices (e.g., the surface sensors 28, 30 and 32 and the downhole sensors 36).

In one embodiment, the operation is performed by a controller according to a selected control and/or optimization algorithm. For example, a model or drilling plan is provided, based on which a control or optimization algorithm is used to calculate parameter set points during the drilling operation. These set points are calculated based on measurement data relating to operational and environmental conditions to maintain the operation within the drilling plans and avoid suboptimal and potentially damaging or dangerous conditions.

In the second stage 62, during the drilling operation, a parameter or parameter combination set point is selected, at which the operation is performed. The controller and/or a human operator applies or adjusts drilling parameters to align the operation with the set point, referred to as the current set point.

In the third stage 63, a processing device such as a drilling control processor defines a parameter space that indicates the limits of parameter values that can be applied during the operation. The input parameter space defines global limits, i.e., overall limits to possible parameters that can be applied. The limits can be applied by a processor implementing a drilling model or plan, or input by an operator or other user. One or more local limits are defined, which specify a parameter value or parameter value range that is smaller than or within the global limits. The local limit (or limits) may be defined by a processor or a human operator. For example, local limits can be set or selected by a driller, set or selected by a processor or can by calculated by an algorithm based on parameters set by the driller (e.g. driller defines +−10%).

An automation control processor (which may be the same as the drilling control processor or a separate component) defines a local limit or subspace that is smaller than the global limit or parameter space. Parameter values that stay within the local limit or subspace may be applied autonomously (or at a selected level of automation). Changes that cause parameter values to go outside of the limit or subspace are applied at a lower level of automation (e.g., an advisory level that requires authorization from a user or a manual level).

In one embodiment, the local limit or subspace (e.g., the size, shape position) is set by the automation control processor. In another embodiment, the local limit or subspace is set by a user or operator. For example, the operator can define the size and shape of the subspace. This allows for additional quality control, as the operator is still responsible since the operator can set a subspace within which all set points do not harm the rig or drilling operation.

Figure 4:
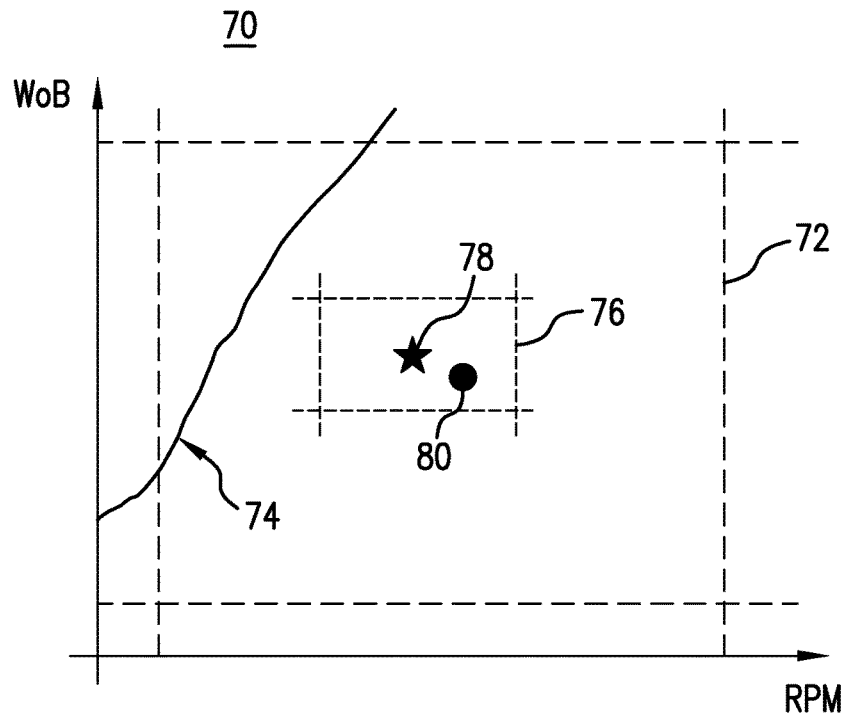
FIG. 4 illustrates an exemplary parameter space used to perform the method of FIG. 3.

An exemplary parameter space 70 is shown in FIG. 4. The parameter space 70 in this example is a two-dimensional space having two parameters, e.g., WOB and RPM. In this example, global limits 72 and 74 are selected for the parameter space, which define the maximum and minimum overall WOB and RPM that can be applied during the drilling operation. Global limits 72 can be selected based on factors such as rig limitations and safety considerations. The global limit 74 can be selected based on factors such as lithology and formation characteristics. The global limits may be selected in real time in response to drilling conditions and measurements. For example, the global limit 74 shown in FIG. 4 is selected based on parameter combinations that could result in dynamic dysfunctions (e.g., stick-slip, whirl). The global limit 74 (or other global limits based on drilling conditions or formation characteristics) can be updated periodically, nearly continuously or in real time based on changing conditions. In one example, the global limit is continuously or nearly continuously updated based on a system model that is fitted with downhole and/or surface data.

A subspace 76 is defined for a target set point 78, in which the drilling system is allowed to act autonomously or at least can be in a higher automation level compared to the total parameter space. For example, a subspace around the target set point is defined as ±20 RPM/±5 kN WOB. If a current set point 80 is within the subspace 76, and the system wishes to change parameters to another set point within the subspace 76, the system is allowed to autonomously change drilling parameters without interfering with the driller. If larger changes are required, the system operates at a lower level of automation, e.g., by giving a recommendation to the operator who then has to apply the changes.

In the fourth stage 64, the drilling control processor proposes or selects a parameter change based on, e.g., measurement data, and selects a new set point. In one example, an optimization algorithm is used to calculate a target set point to which the drilling parameters are suggested to be adjusted. In another example, the parameter change (e.g., one or more test points) is selected by the drilling control processor in order to excite the system in order to update a model or quality function.

In the fifth stage 65, the processor determines whether the new set point or new target set point is outside of the subspace. The automation control processor selects a level of automation based on the new set point position relative to the subspace or relative to a local limit.

In the sixth stage 66, the parameters are adjusted by a processor and/or an operator based on the selected level of automation. For example, an optimization algorithm (e.g. downhill simplex) applies a proposed change (e.g., a target set point or test point) that maintains the drilling parameter or parameters inside the subspace. If the proposed change results in a parameter being outside the subspace, the proposed change is applied by the operator or is applied by processor with involvement of the operator (e.g., notification to the operator or permission by the operator).

Although the examples described herein describe selecting a first and second level of automation, they are not so limited. The automation control algorithm can select among any number of automation levels (e.g., levels 1-10 described above or groups of the levels) based on various considerations. In addition, the number and magnitude of local limits or subspaces are not limited to those described herein.

In addition to setting local limits or subspaces around current or target set points, the processor can determine automation level based on other considerations. For example, some optimization algorithms provide for a pre-defined sequence of set point changes. In addition, some algorithms or methods include adding noise or pseudo-random bit stream (PRBS) to set points. Such pre-selected changes can be identified and allowed to be applied at a high automation level regardless of the local limit or subspace.

Figure 5:
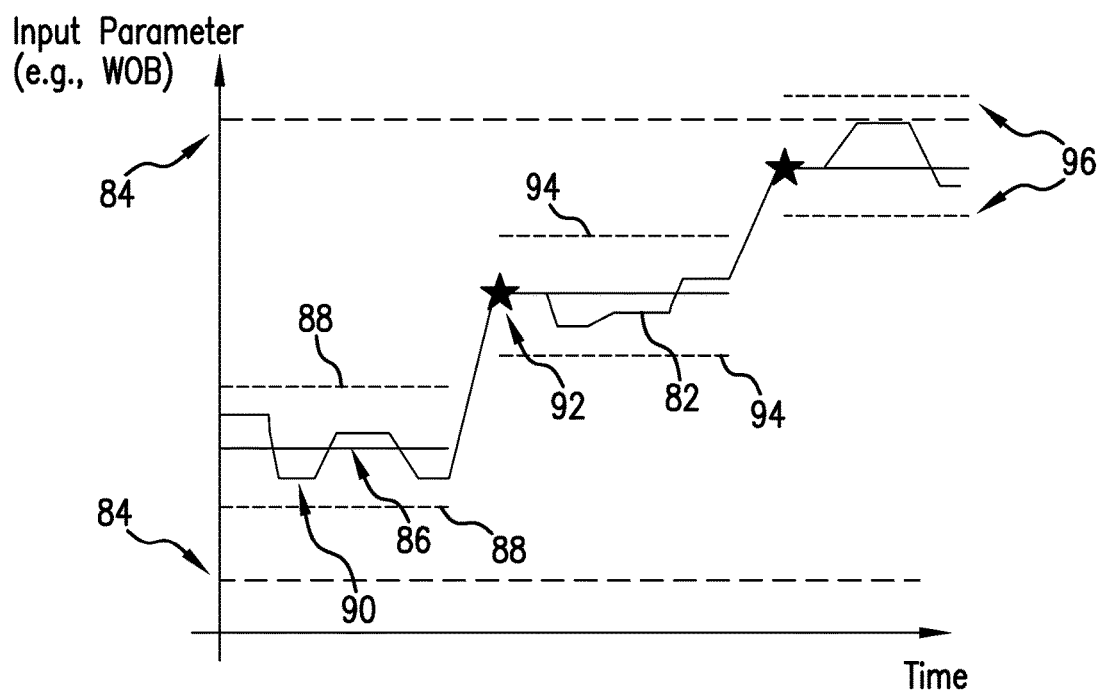
FIG. 5 illustrates aspects of an exemplary method of controlling a drilling operation and selecting automation levels.

An example of the method 60 is shown in FIG. 5, which shows an input parameter (e.g., WOB) selected or calculated by an optimization algorithm. A line or curve 82 shows the progression of the WOB as applied by a drilling system (the operator or the control processor) over a portion of the drilling operation.

The optimization algorithm and/or an operator defines global limits 84 for the input parameter. During a first portion of the drilling operation, the optimization algorithm provides a target set point 86 for the parameter, and local limits 88 (an upper and lower limit) are selected for the target set point. As the actual or current set point changes, an automation control processor determines the level of automation that can be employed for each set point or parameter change. For example, a set point change to the set point 90 can be performed at a high automation level, e.g., automatically without operator intervention or involvement.

If the optimization algorithm selects a new target set point 92 that is outside of the local limits 88 (or the parameter change otherwise goes outside of the local limits), the set point is changed using a lower automation level, e.g., manually by the operator, or requiring operator notification and/or approval. For example, in order to apply the parameter to the new target set point 92, the new set point is proposed to the operator or driller, and the operator has to confirm the new set point before a controller can change the parameter. The automation control processor then sets new local limits 94 for the new target set point. As shown in FIG. 5, regardless of the bounds of a local limit (e.g., local limits 96), the parameter will not be allowed to exceed the global limit 84.

It is noted that, although the shape and size of the subspace is the same for all target set points, it is not so limited. The subspace can be defined to have a different size and/or shape depending on characteristics of the set point (e.g., parameter values, depths, time during the drilling operation). In addition, the subspace can not only be defined around a target set point, but can also be defined around any current set point or set point at which the system is actually operating.

As discussed above, drilling optimization and/or control can be performed by any suitable technique or method. Generally, a drilling optimization method includes receiving measurement data (e.g., surface and/or downhole) that indicates conditions and parameters relating to the drilling operation, and outputting proposed drilling parameters. A processor performing the optimization may control the drilling operation to align with the proposed drilling parameters, or communicate with another processor or algorithm and/or with an operator. In one embodiment, a drilling optimization method is performed by using an online identification approach (e.g. downhill simplex algorithm), or by fitting a process model with downhole and/or surface data (offline optimization).

In one embodiment, a multi-stage optimization is performed. The multi-stage process alleviates the need to define a general quality function, which can be quite difficult and is not always possible. One reason for this difficulty is that the optimization problem may not be unique. For example, it is possible to have either a stick-slip or a stable drilling state for the same combination of RPM and WOB. Whether the drilling system is stable for a given RPM-WOB combination depends, among other things, on the history of applied inputs. Another reason for the difficulty in defining a general quality function is that there are often multiple optimization goals with different priorities. In case of a high priority goal (e.g., prevent BHA damage) and a low priority goal (e.g., optimize performance) a resulting quality function calculated by weighing the single quality functions often leads to a poor optimization performance.

This embodiment includes performing optimization relative to an optimization goal that is the highest priority (e.g. prevent BHA damage) to be able to react quickly. After this optimization is performed, further optimization with respect to other goals is performed. Events or conditions (e.g., vibration levels) are continuously or periodically monitored in order to decide whether to return to performing the highest priority optimization.

Figure 6:
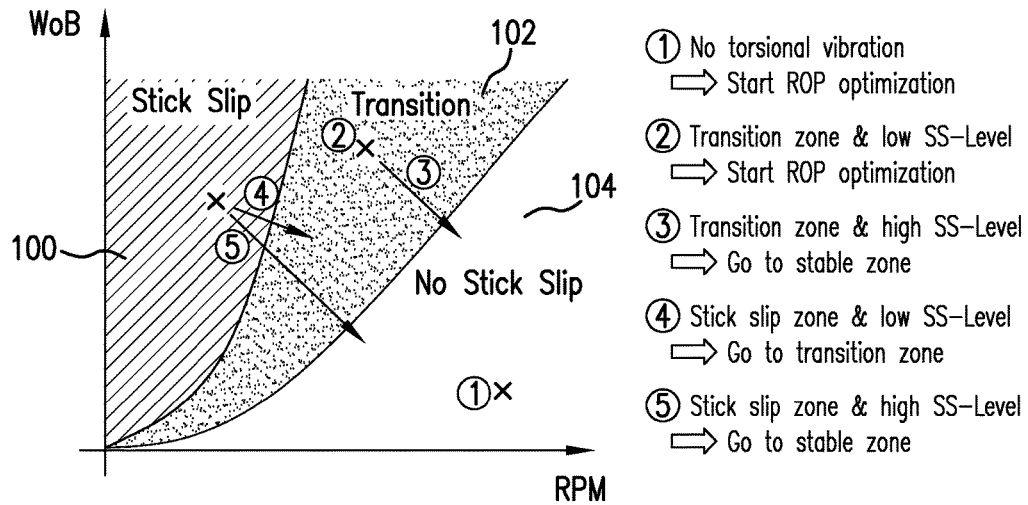
FIG. 6 illustrates aspects of a portion of an embodiment of a multi-stage drilling optimization method.
Figure 7:
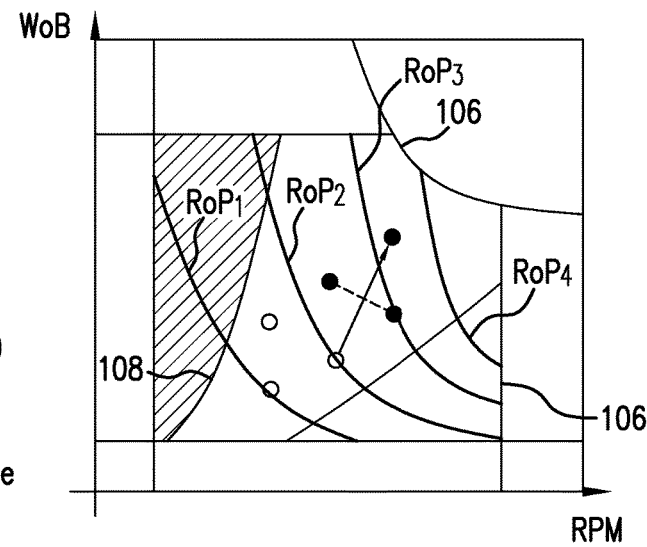
FIG. 7 illustrates aspects of a portion of the method of FIG. 6.
Figure 8:
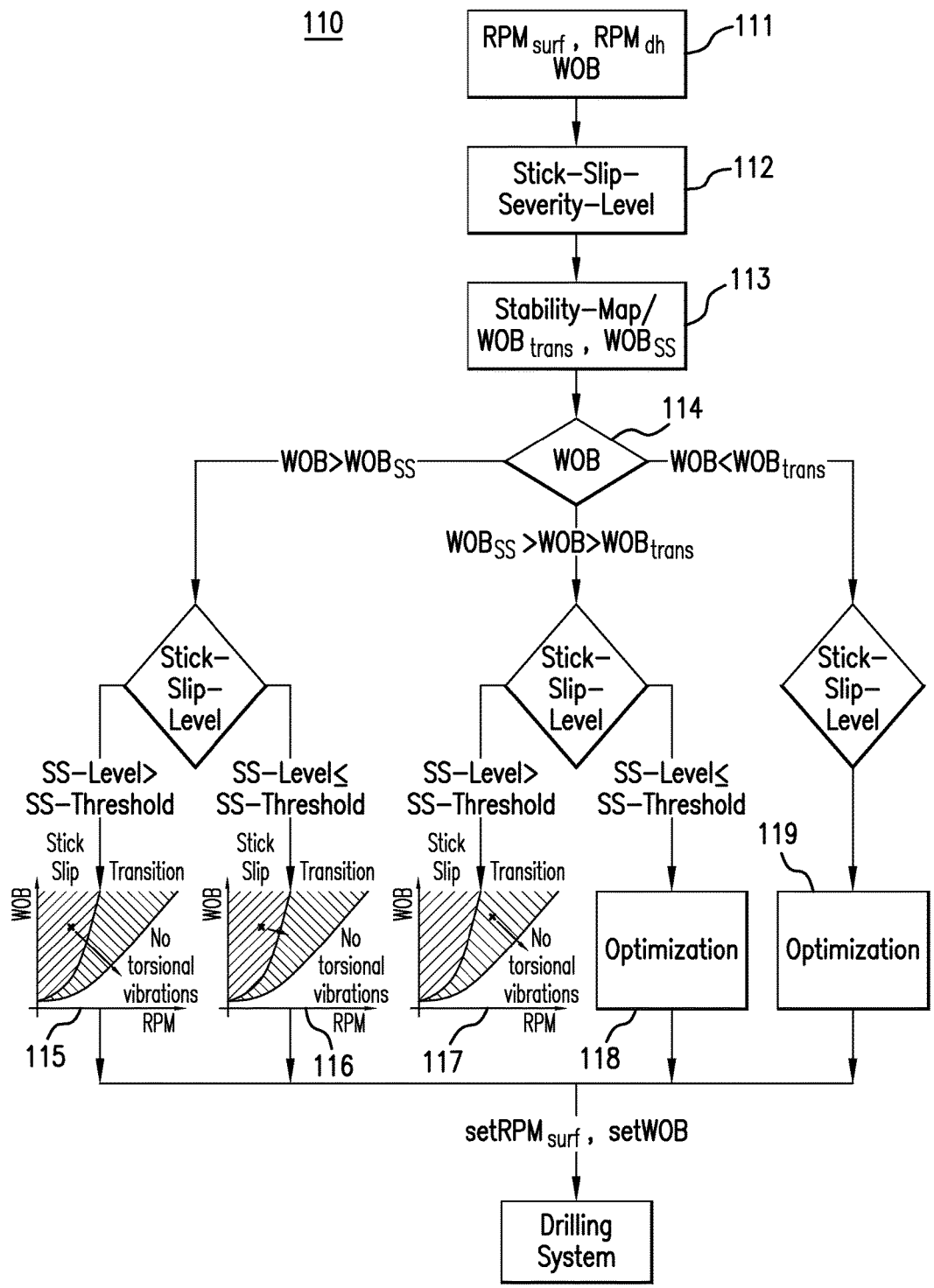
FIG. 8 illustrates aspects of a portion of the method of FIG. 6.

FIGS. 6-8 illustrate parts of an exemplary multi-stage optimization method that can provide selected or proposed drilling parameters (e.g., target set points) and/or control a drilling operation. In this example, the highest priority goal is to avoid stick-slip conditions. A lower priority goal is to increase ROP. Additional lower priority goals may be applied as desired.

In the first stage, the method provides optimization parameters to avoid stick-slip (high priority optimization). If a level of stick-slip is identified or estimated, the high priority optimization is triggered. Stick-slip can be identified and/or estimated based on suitable measurement data. For example, RPM data taken downhole can be used to determine whether the RPM of the drilling assembly or downhole tool decreases significantly over a selected period of time. The level of such stick-slip (SS) can be estimated based on factors such as the amount of decrease and/or the rate of decrease.

FIG. 6 shows an example of the high priority optimization, which defines a WOB-RPM parameter space and a set of rules. The parameter space includes a "Stick Slip" zone 100, a "Transition" zone 102 and a "No Stick Slip" zone 104. If the current drilling parameters are in the Stick Slip zone 100 and the system has a low SS level, the parameters are selected to be in the Transition zone 102. If the current drilling parameters are in the Stick Slip zone 100 or the Transition zone 102 and the system has a high SS level, the parameters are selected to be in the stable No Stick Slip zone 104. If the current drilling parameters are in the No Stick Slip zone 104 or are in the Transition zone 102 and the system has a low SS level, the method proceeds to the ROP or other lower priority optimization.

In the second stage, once the parameters have been optimized to avoid stick-slip, the method proceeds to a lower priority optimization, such as a ROP optimization. In this example, the lower priority optimization is ROP optimization using a quality function "J" based on, e.g., ROP and a safety margin. This optimization can be an online optimization (e.g., a downhill simplex algorithm, a rule based approach, fuzzy control, etc.). The optimization can be an offline optimization. For example, as shown in FIG. 7, a ROP model based on WOB, RPM and other parameters is selected. Examples of the ROP model ("ROP1" through "RoP4") are shown in a parameter space. The parameter space in which the WOB and RPM can be applied may be subject to global limits 106 and limits such as a limit 108 based on an estimated stick slip zone. Optimal set points are calculated using the model and measured parameters during a drilling operation.

In the third stage, stick-slip (SS) levels are monitored to determine if the method should return to the high priority. An exemplary portion 110 of the method is shown in FIG. 8. At block 111, surface and downhole RPM measurements ($RPM_{surf}$ and $RPM_{dh}$) and WOB measurements are taken. At block 112, the SS level is calculated based on these measurements, and at block 113, $WOB_{trans}$ (the WOB value at the start of the transition zone 102) and $WOB_{SS}$ (the WOB value at the start of the Stick Slip zone 100) is calculated. At block 114, the measured WOB is compared to the $WOB_{trans}$ and $WOB_{SS}$. If $WOB > WOB_{SS}$, WOB and RPM parameters are calculated at blocks 115 and 116 according to the high priority optimization based on whether the SS level is high or low. For example, optimization is performed based at least on whether the SS level exceeds a selected threshold (e.g., >SS-threshold such as 2) or whether the SS level is less than or equal to the selected threshold (e.g., ≤SS-threshold such as 2), as described above with reference to FIG. 6. If the WOB is between $WOB_{trans}$ and $WOB_{SS}$, high priority optimization is performed at block 117 if the SS level is high, and ROP optimization is continued at block 118 if the SS level is low. If $WOB < WOB_{SS}$, ROP optimization is continued at block 119. In this way, optimal or selected set points are output to the system at block.

Another embodiment of an optimization process includes using a combination of offline and online optimization. At the beginning, an online optimization is performed that includes applying several set points and evaluating a quality function. Information gathered at the recent set points is used to identify one or more models (e.g., ROP-model, Vibration model, etc.) that are used for an offline optimization. Once the parameters required for the model(s) have been estimated, an offline optimization algorithm is used to calculate an optimal or preferred set point based on the model(s). The operating parameters are adjusted to the optimal or preferred set point. This process is continued over the course of the drilling operation, using the quality function and the model(s) to select set points, and keeping track of the changing drilling system. If the system has significantly changed (e.g. due to drilling into a different formation), the process switches back to online optimization only until sufficient measurements are available to update the models that are required for offline optimization.

The systems and methods described herein provide various advantages over prior art techniques. The systems and methods allow for automation of some parameter changes during a drilling operation, which relieves a human operator from performing all parameter changes. In one embodiment, the systems and methods preserve operator control while reducing workload, e.g., by allowing the operator to select local limits and guarantee the operator's involvement in significant parameter changes.

For example, relatively small parameter changes that are continually made to find optimal parameters or update models (e.g., made about every three minutes) can be taken over by an automated controller. This relieves the operator from having to perform these tasks, while still involving the operator in larger parameter changes.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of facilitating a drilling operation, comprising:
receiving a current set point for a drilling operation, the current set point indicating a value of an operational parameter at which the drilling operation is being performed;
receiving a global limit indicating at least one of a maximum and a minimum value of the operational parameter that is permitted to be applied for the drilling operation;
defining a local limit for the operational parameter, the local limit indicating at least one of a local maximum value and a local minimum value of the operational parameter, the local limit being a subset of the global limit;
receiving a parameter change value, the parameter change value indicating a proposed change to the operational parameter from the current set point; and
adjusting the operational parameter according to a level of automation, the level of automation based on a comparison of the parameter change value and the local limit, the level of automation being a first level of automation based on the parameter change causing the parameter to be within the local limit, the level of automation being a second level based on the parameter change causing the parameter to be outside the local limit and within the global limit, the first level and the second level having different levels of human involvement, the first level of automation based on a value of the operational parameter being within the local limit if the proposed change is applied to the drilling operation, and the second level of automation based on the value of the operational parameter being outside the local limit if the proposed change is applied to the drilling operation.

2. The method of claim 1, wherein the parameter change value is provided by a drilling optimization algorithm.

3. The method of claim 1, wherein the parameter change value includes a target set point indicating a target value of the operational parameter.

4. The method of claim 1, wherein the local limit is selected independent of at least one of the current set point and the target set point, or is relative to at least one of the current set point and the target set point.

5. The method of claim 1, wherein the parameter change value includes one or more parameter changes selected to excite a drilling system to provide drilling system model information.

6. The method of claim 1, wherein the first level of automation is full automation in which a processor can autonomously adjust the drilling operation, and the second level of automation requires involvement by a human operator.

7. The method of claim 1, further comprising adjusting the operational parameter during the drilling operation by at least one of a processor and a human operator.

8. The method of claim 1, wherein the operational parameter includes a plurality of parameters that define a parameter space, and the local limit defines a subspace within the parameter space.

9. The method of claim 8, wherein the subspace is defined for each of the plurality of parameters, and the local limit includes a respective local limit for each of the plurality of parameters, each local limit associated with a selected level of automation.

10. The method of claim 9, wherein defining the local limit is performed by at least one of a processor and a human operator.

11. A system for facilitating a drilling operation, comprising:
a carrier configured to be disposed in a borehole in an earth formation;
at least one of a surface sensor and a downhole sensor configured to measure parameters associated with the drilling operation;
a drilling control processor configured to receive a current set point for a drilling operation, the current set point indicating a value of an operational parameter at which the drilling operation is being performed, the drilling control processor configured to generate a proposed change to the operational parameter from the current set point, the operational parameter subject to a global limit indicating at least one of a maximum and a minimum value of the operational parameter that is permitted to be applied for the drilling operation; and
an automation control processor configured to:
receive the current set point, the global limit and a parameter change value indicating the proposed change;
define a local limit for the operational parameter, the local limit indicating at least one of a local maximum value and a local minimum value of the operational parameter, the local limit being a subset of the global limit; and
adjust the operational parameter according to a level of automation, the level of automation based on a comparison of the parameter change value and the local limit, the level of automation being a first level of automation based on the parameter change causing the parameter to be within the local limit, the level of automation being a second level based on the parameter change causing the parameter to be outside the local limit and within the global limit, the first level and the second level having different levels of human involvement, the first level of automation based on a value of the operational parameter being within the local limit if the proposed change is applied to the drilling operation, and the second level of automation based on the value of the operational parameter being outside the local limit if the proposed change is applied to the drilling operation.

12. The system of claim 11, wherein the drilling control processor executes a drilling optimization algorithm to generate the proposed change.

13. The system of claim 11, wherein the parameter change value includes a target set point indicating a target value of the operational parameter.

14. The system of claim 11, wherein the parameter change value includes one or more parameter changes selected to excite a drilling system to provide drilling system model information.

15. The system of claim 13, wherein the local limit is selected independent of at least one of the current set point and the target set point, or is relative to at least one of the current set point and the target set point.

16. The system of claim 11, wherein the first level of automation is full automation in which a processor can autonomously adjust the drilling operation, and the second level of automation requires involvement by a human operator.

17. The system of claim 15, wherein the operational parameter includes a plurality of parameters that define a parameter space, and the local limit defines a subspace within the parameter space that surrounds at least one of the current set point and the target set point.

18. The system of claim 12, wherein the drilling optimization algorithm provides an optimization method that includes:
optimizing the drilling operation relative to a first priority goal;
optimizing the drilling operation relative to a second priority goal after the drilling operation is optimized relative to the first priority goal; and
monitoring the drilling operation to determine whether the drilling operation remains optimized relative to the first priority goal.

* * * * *